United States Patent
Liu et al.

(10) Patent No.: US 11,878,553 B2
(45) Date of Patent: Jan. 23, 2024

(54) COMPOUND WHEEL ASSEMBLING APPARATUS

(71) Applicant: CITIC Dicastal CO., LTD., Hebei (CN)

(72) Inventors: Weidong Liu, Qinhuangdao (CN); Minglei Li, Qinhuangdao (CN); Dexi Du, Qinhuangdao (CN); Shaoqian Wang, Qinhuangdao (CN); Xiaomian Sun, Qinhuangdao (CN); Shiwen Xu, Qinhuangdao (CN)

(73) Assignee: CITIC Dicastal CO., LTD., Hebei (CN)

( * ) Notice: Subject to any disclaimer, the term of this patent is extended or adjusted under 35 U.S.C. 154(b) by 819 days.

(21) Appl. No.: 16/693,913

(22) Filed: Nov. 25, 2019

(65) Prior Publication Data

US 2020/0406677 A1    Dec. 31, 2020

(30) Foreign Application Priority Data

Jun. 27, 2019   (CN) .......................... 201910565551.5

(51) Int. Cl.
   *B60B 31/00*   (2006.01)
(52) U.S. Cl.
   CPC ........ *B60B 31/005* (2013.01); *B60B 2320/12* (2013.01)
(58) Field of Classification Search
   CPC ..................... B60B 31/005; B60B 2320/12
   See application file for complete search history.

(56) References Cited

U.S. PATENT DOCUMENTS

| 10,175,145 B2 * | 1/2019 | Liu .................... G01M 1/225 |
| 10,259,278 B2 * | 4/2019 | Liu et al. ............... B60S 5/046 |
| 2018/0003592 A1 | 1/2018 | Liu et al. |
| 2019/0063902 A1 | 2/2019 | Liu et al. |
| 2020/0406678 A1 * | 12/2020 | Liu ........................ B60B 31/02 |

FOREIGN PATENT DOCUMENTS

| CN | 202780931 U | 3/2013 |
| CN | 203580501 U | 5/2014 |
| CN | 106004273 A | 10/2016 |
| CN | 106394118 A | 2/2017 |
| CN | 107008937 A | 8/2017 |
| CN | 107309462 A | 11/2017 |
| CN | 107388977 A | 11/2017 |

(Continued)

OTHER PUBLICATIONS

European Search Report in the European application No. 19219872.9, dated Jul. 13, 2020, 6 pgs.

*Primary Examiner* — Jason R Bellinger
(74) *Attorney, Agent, or Firm* — Cooper Legal Group, LLC (57) ABSTRACT

The present disclosure provides a compound wheel assembling apparatus including a tensioning and fixing component and a locating ring; the tensioning and fixing component is arranged to extend into a center hole of a flange to tension and fix a flange; the tensioning and fixing component includes a base plate, a flange plate, springs, expanding petals and an expanding core; the locating ring is arranged around the base plate, and has a center axis overlapping a center axis of the base plate; the locating ring has a circle of circular-ring-shaped protrusion on its outer side.

10 Claims, 10 Drawing Sheets

(56) References Cited

FOREIGN PATENT DOCUMENTS

| | | | |
|---|---|---|---|
| CN | 108099495 | A | 6/2018 |
| CN | 105928476 | B | 7/2018 |
| CN | 207931368 | U | 10/2018 |
| CN | 108759608 | A | 11/2018 |
| CN | 108790595 | A | 11/2018 |
| CN | 208322791 | U | 1/2019 |
| CN | 210174533 | U | 3/2020 |
| EP | 2749431 | A2 | 7/2014 |
| FR | 649965 | A | 12/1928 |

\* cited by examiner

(Prior Art)

COMPOUND WHEEL ASSEMBLING APPARATUS

CROSS-REFERENCE TO RELATED APPLICATION

The present application claims benefit of Chinese Patent Application No. 201910565551.5, filed on Jun. 27, 2019, the contents of which are hereby incorporated by reference in their entirety.

BACKGROUND

Wheels are important safety parts and appearance parts in automobiles. The fashion demand of automobiles makes the shape and structure of wheels more diversified. A compound wheel is one of the most popular wheels. However, the assembling of the compound wheel has always been a problem to be solved. The various properties and positional relationship of an assembled wheel are problems that must be solved in a compound wheel. Manual assembling not only difficultly guarantees the properties of a wheel, but also easily causes a problem of compound wheel hop due to assembling errors, therefore the smoothness and safety of vehicle driving are affected, and the labor intensity of workers is high and production efficiency is low.

SUMMARY

The present disclosure relates to the technical field of assembling apparatuses, and in particular, to a compound wheel assembling apparatus.

An embodiment of the present disclosure provides a compound wheel assembling device, which can solve the technical problems in the background art. On one aspect, a tensioning and fixing component structure is designed. Movement of an expanding core cooperates with expanding petals so as to fix a flange plate tightly to meet automatic assembling requirements of a wheel, which reduces the labor intensity of workers, saves the labor cost and improves the production efficiency. On the other aspect, a locating ring is provided. Since the locating ring and the expanding core are extremely high in coaxiality, a coaxiality requirement for a hub and a wheel rim after wheel assembling is guaranteed, and then wheel hop is ensured to be qualified.

In order to achieve the above objectives, the present disclosure provides the following solution.

In the first aspect of the present disclosure provides a compound wheel assembling apparatus, including a tensioning and fixing component and a locating ring, herein the tensioning and fixing component may extend into a center hole of a hub to tension and fix a hub; the tensioning and fixing component comprises a base plate, a flange plate, springs, expanding petals and an expanding core; the flange plate is used for placing the hub and is fixed on the base plate; through holes are formed in the middles of the flange plate and in the middle of the base plate; a plurality of T-shaped sliding chutes uniformly distributed in a circumference are formed in inner cavities of the flange plate and the base plate; the number of the expanding petals is equal to the number of the T-shaped sliding chutes; the bottom surface of the expanding petal is of an T-shaped structure matched with the T-shaped sliding chute; the expanding petals is capable of sliding in the T-shaped sliding chutes; side walls, facing a center axis of the hub, of the expanding petals are slopes; the springs are arranged between the expanding petals and the flange plate; when the expanding petals move along the T-shaped sliding chutes to the inner side wall of the center hole of the hub, the springs are compressed by the expanding petals; the expanding core has slopes, which are consistent in inclination angle and suitable for the expanding petals, on the side surfaces; the expanding core is capable of moving up and down; the slopes of the expanding core are matched with the side walls of the expanding petals; the movement of the expanding core pushes the expanding petals to move toward the inner side wall of the center hole of the hub, and the expanding petals compress the springs and press the inner side wall of the center hole of the hub to fix the position of the hub; and the locating ring is arranged around the base plate, and has a center axis overlapping a center axis of the base plate; the locating ring has a circle of circular-ring-shaped protrusion on its outer side; and the circular-ring-shaped protrusion is used for mounting a wheel rim of a wheel or a connection piece of the wheel rim of the wheel. In the present embodiment, on one aspect, the tensioning and fixing component structure is designed. Movement of the expanding core cooperates with the expanding petals to fix the flange plate tightly to meet automatic assembling requirements of a wheel, which reduces the labor intensity of workers, saves the labor cost, improves the production efficiency and guarantees the reliability of assembling and the product quality. On the other aspect, the locating ring is provided. Since the locating ring and the expanding core are extremely high in coaxiality, a coaxiality requirement for a hub and a wheel rim of an assembled wheel is guaranteed, and then wheel hop is ensured to be qualified.

In some embodiments, herein the expanding petals of the tensioning and fixing component may have a plurality of different horizontal expanding and retracting moving distance ranges, so that cooperation of the expanding petals and the expanding core can be adjusted according to the size of the diameter of the center hole of the hub in a wheel to select an appropriate horizontal expanding and retracting moving distance range. In the present embodiment, it is designed that the expanding petals have a plurality of different horizontal expanding and retracting moving distance ranges, so that the expanding petals may realize large-travel expansion and retraction to make the apparatus high in generality and meet requirements of sizes of center holes of different types of wheels.

Further, herein the expanding petals may have two different horizontal expanding and retracting moving distance ranges; the expanding core includes a middle cone, first slopes and second slopes on the conical surface of the cone; the first slopes and the second slopes are consistent with the inclination angles of the expanding petals; the first slopes and the second slopes have a height difference; and a plurality of first slopes and a plurality of second slopes are distributed around the circumference of the conical surface of the cone in a uniform spacing manner. In the present embodiment, it is designed that the expanding core includes a plurality of slopes, and the multiple horizontal expanding and retracting moving distances are designed for the expanding petals, so that the structure is simple and reliable, and the practicability is high.

Preferably, herein eight expanding petals, eight first slopes and eight second slopes may be provided. In the present embodiment, the number may be set according to an actual requirement. In the present embodiment, the number is equal to 8. When the second servo motor drives the expanding core to rotate 22.5 degrees, the expanding petals cooperating with the slopes are switched between the first slopes and the second slopes of the expanding core, thereby allowing an expanding and retracting diameter of the expanding petals to vary in two different ranges. A rotating distance and a rotating angle are moderate, and the practicability is high.

In the present embodiment, herein the tensioning and fixing component also includes an expanding petal rotating component, an expanding core rotating component and an expanding core lifting component; the expanding petal rotating component may drive the base plate, the flange plate and the expanding petals to rotate horizontally to allow the side walls of the expanding petals to be matched with the corresponding slopes of the expanding core; the expanding core rotating component may drive the expanding core to rotate to allow the side walls of the expanding petals to be matched with the corresponding slopes of the expanding core; the expanding core lifting component may drive the expanding core to move up and down; the expanding core lifting component is arranged inside the expanding core rotating component; and the expanding core rotating component is arranged inside the expanding petal rotating component. In the present embodiment, a rotating mechanism for the tensioning and fixing component is designed. The expanding core pushes the expanding petals to be tensioned by adjusting an expanding petal rotating component, an expanding core rotating component and an expanding core lifting component, so that the adjustability is high, adjustment is facilitated, and the practicability is high.

Further, herein the expanding petal rotating component includes a first servo motor, a power synchronizing belt wheel, a synchronizing belt, a driven synchronizing belt wheel, a first connection shaft, and a first shaft sleeve; an output shaft of the first servo motor is fixedly connected with the power synchronizing belt wheel; the power synchronizing belt wheel is connected with the driven synchronizing belt wheel through the synchronizing belt; the driven synchronizing belt wheel is connected to the first connection shaft; the first connection shaft is fixed at an end of the first shaft sleeve; the base plate is fixed at another end of the first shaft sleeve; the first servo motor drives the power synchronizing belt wheel to rotate; the power synchronizing belt wheel drives the driven synchronizing belt wheel to rotate through the synchronizing belt; and the driven synchronizing belt wheel drives the expanding petals to rotate through the first connection shaft, the first shaft sleeve and the base plate.

Further, herein a base is fixedly mounted inside a stand; and the first shaft sleeve is mounted on the base through first bearings and an end cover.

Further, herein the expanding core rotating component is arranged in the first shaft sleeve, and includes a second servo motor, a second connection shaft, a second shaft sleeve and a third connection shaft; an output shaft of the second servo motor is fixedly connected with the second connection shaft; the second connection shaft is fixed at an end of the second shaft sleeve; the third connection shaft is arranged at another end of the second shaft sleeve; the expanding core is connected with the second shaft sleeve through the third connection shaft; the second shaft sleeve is mounted on the first shaft sleeve through two columns of second bearings and a gland; the expanding core, the third connection shaft and the second shaft sleeve are locked in the circumferential direction, with no relative rotation; the third connection shaft and the second shaft sleeve may move up and down relatively along an axial direction; and the second servo motor drives the expanding core to rotate through the second connection shaft, the second shaft sleeve and the third connection shaft.

Further, herein the expanding core lifting component may be arranged in the second shaft sleeve, and includes an oil cylinder; a piston rod of the oil cylinder is connected with an end of the third connection shaft, and another end of the third connection shaft is fixedly connected with the expanding core; and the oil cylinder drives the expanding core to move up and down through the third connection shaft.

Further, herein a protective part may be further arranged on the expanding core; and the protective part, the expanding core and the third connection shaft are fixed into a whole through bolts. In the present embodiment, a protective part is also provided, so that traces formed on a wheel in an assembling and tensioning process are avoided, and the safety of the expanding core is also guaranteed to protect the expanding core from being deformed by collision to affect the tensioning degree, and a protective effect is achieved.

Compared with the related art, the present disclosure has the following beneficial effects:

according to the compound wheel assembling device provided by the present disclosure, on one aspect, the tensioning and fixing component structure is designed. Movement of the expanding core cooperates with the expanding petals to fix the flange plate tightly to meet automatic assembling requirements of the wheel, which reduces the labor intensity of workers, saves the labor cost, improves the production efficiency and guarantees the reliability of assembling and the product quality. On the other aspect, the locating ring is provided. Since the locating ring and the expanding core are extremely high in coaxiality, the coaxiality requirement for the hub and the wheel rim of the assembled wheel is guaranteed, and then the wheel hop is ensured to be qualified.

BRIEF DESCRIPTION OF DRAWINGS

In order to more clearly explain the technical solution in the embodiments of the present disclosure, drawings which require to be used in description of the embodiments are simply introduced below, obviously, the drawings in description below are some embodiments of the present disclosure, and those having ordinary skill in the art can further acquire other drawings without creative efforts according to those drawings.

List of reference symbols: 1: stand; 2: first servo motor; 3: power synchronizing belt wheel; 4: synchronizing belt; 5: driven synchronizing belt wheel; 6: base; 7: first connection shaft; 8: second servo motor; 9: first shaft sleeve; 10: lower end cover; 11: second connection shaft; 12: second shaft sleeve; 13: oil cylinder; 14: first bearing; 15: end cover; 16: gland; 17: second bearing; 18: base plate; 19: flange plate; 20: pin shaft; 21: spring; 22: expanding petal; 23: third connection shaft; 24: protective part; 25: expanding core; 26: locating ring; 27: first slope; 28: second slope; 29: cone; 30: hub; 31: titanium alloy spoke; 32: locking sleeve; 33: steel sleeve; 34: connection ring; 35: connection bolt; 36: carbon fiber wheel rim; 37: thread; 38: assembling hole; 39: ring slot; 40: threaded hole; 41: first mounting hole; 42: second mounting hole; 43: mandrel; 44: snap ring; 45: second base.

DETAILED DESCRIPTION

The technical solution in the embodiments of the present disclosure is clearly and completely described in combination with drawings of the embodiments of the present disclosure below, and obviously, the described embodiments are part of embodiments of the present disclosure rather than all embodiments. Based on the embodiments of the present disclosure, all the other embodiments obtained by those having ordinary skill in the art without any creative works are within the protection scope of the present disclosure.

The terms "first", "second", "third", "fourth" and the like in the specification and in the claims of the present disclosure are used for distinguishing different objects but not for describing a specific sequence. Furthermore, the terms 'comprise' and 'have' as well as their any variations are intended to cover a non-exclusive inclusion. For example, a process, method, system, product or equipment including a series of steps or units does not limit steps or units which have been listed, but selectively further includes steps or units which are not listed, or selectively further includes other inherent steps or units for the process, method, product or equipment.

Reference in the specification to "embodiments" of the present disclosure means that a particular feature, structure or characteristic described in connection with the embodiments is included in at least one embodiment of the present disclosure. The appearances of the phrase "the embodiments" in various places in the specification are not necessarily all referring to the same embodiment, nor are separate or alternative embodiments necessarily mutually exclusive of other embodiments. It will be explicitly and implicitly understood by those skilled in the art that the embodiments described in the present disclosure can be combined to other embodiments.

In order to further understand the content, features and functions of the disclosure, the following embodiments are given and illustrated with the attached drawings as follows.

First Embodiment

Figure 1:
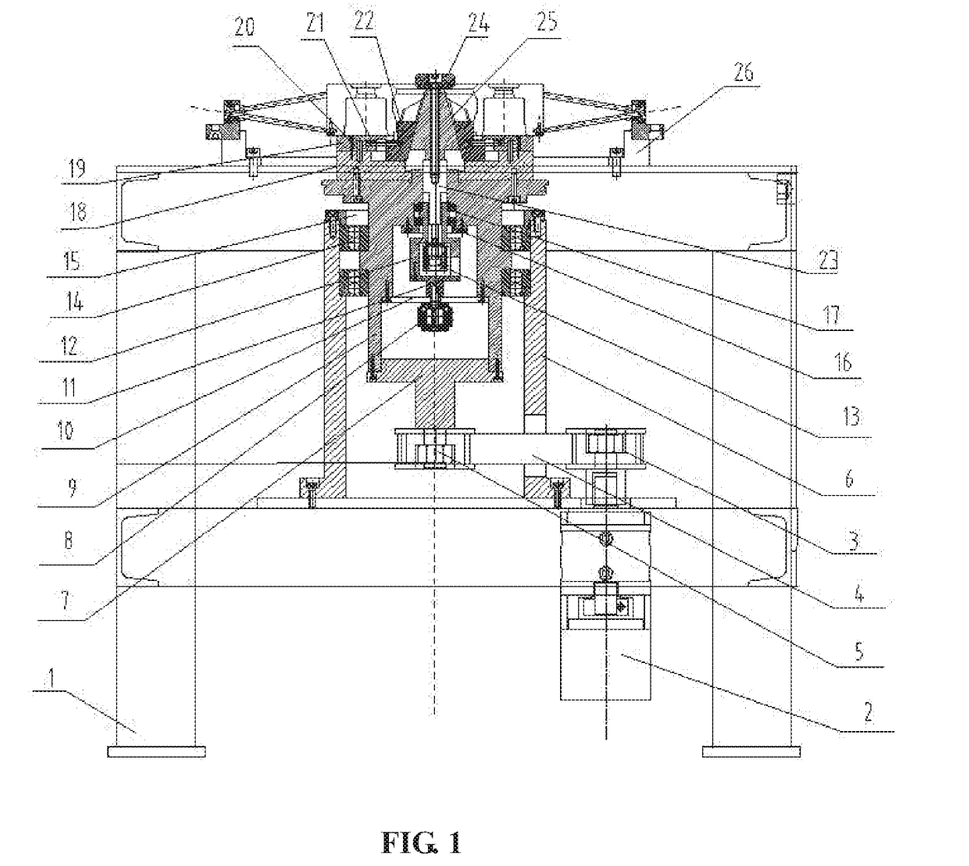
FIG. 1 is a structural schematic diagram of a compound wheel assembling apparatus of the present disclosure.
Figure 2:
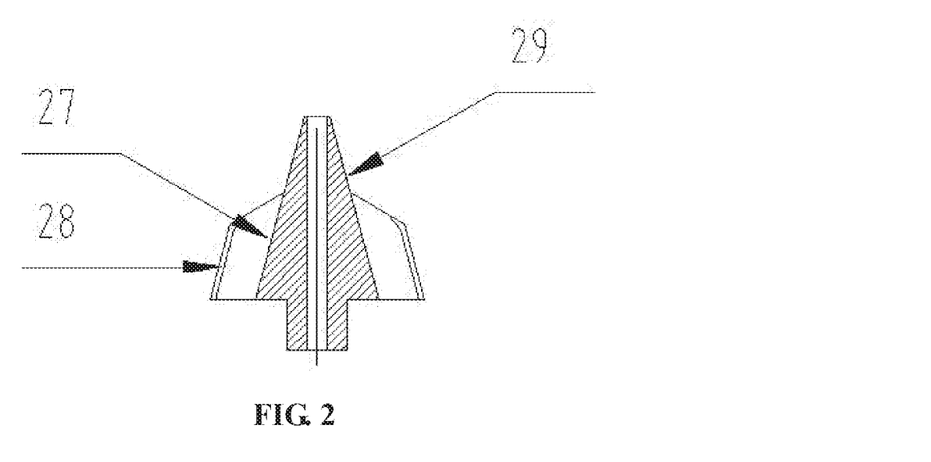
FIG. 2 is a front view of an expanding core structure of a compound wheel assembling apparatus of the present disclosure.
Figure 3:
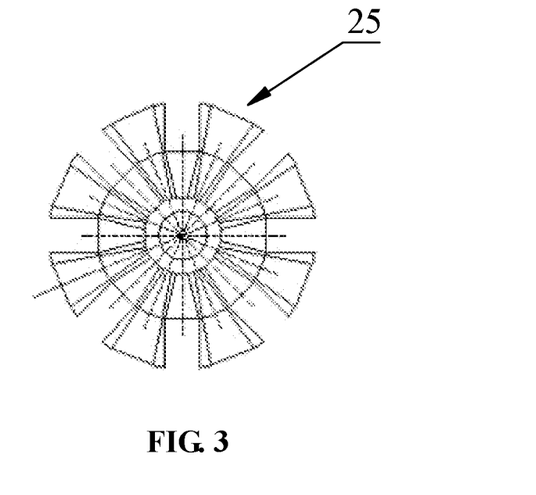
FIG. 3 is a top view of an expanding core structure of a compound wheel assembling apparatus of the present disclosure.
Figure 4:
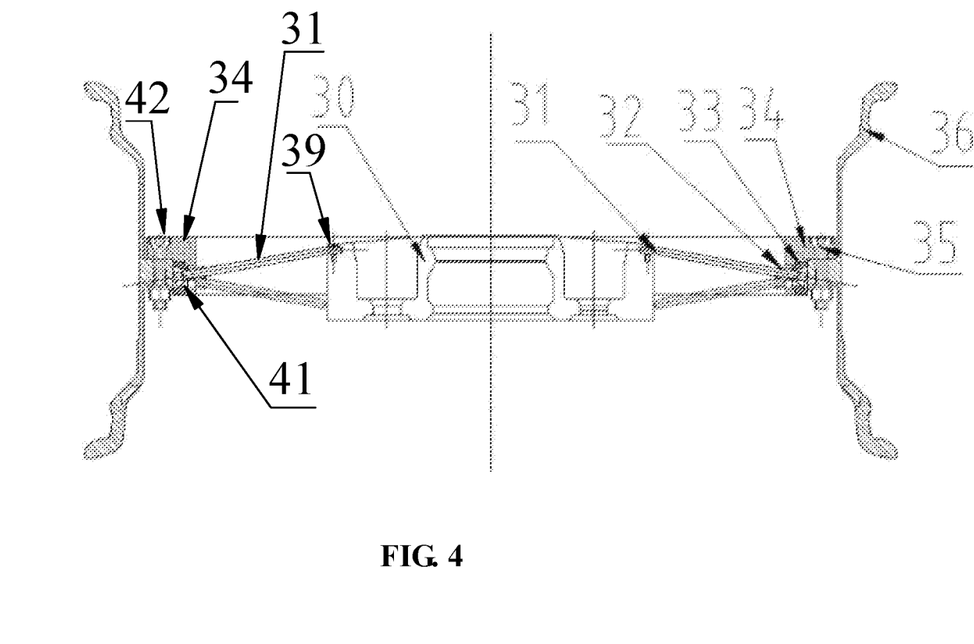
FIG. 4 is an overall structural schematic diagram of a light-weight compound wheel.
Figure 5:
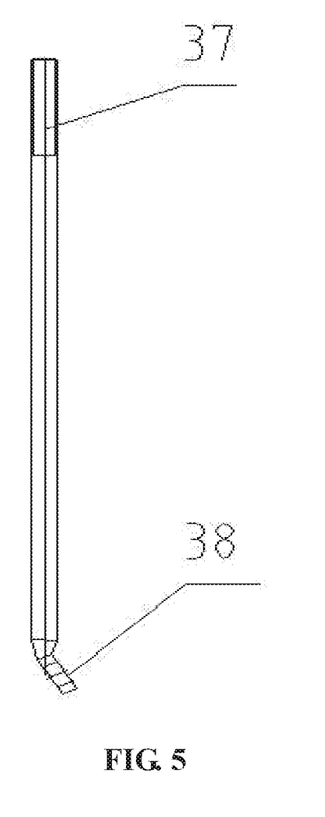
FIG. 5 is a structural schematic diagram of a titanium alloy spoke of a light-weight compound wheel.
Figure 6:
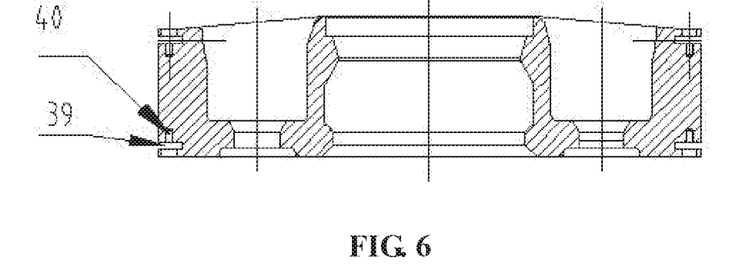
FIG. 6 is a structural schematic diagram of a hub of a light-weight compound wheel.
Figure 7:
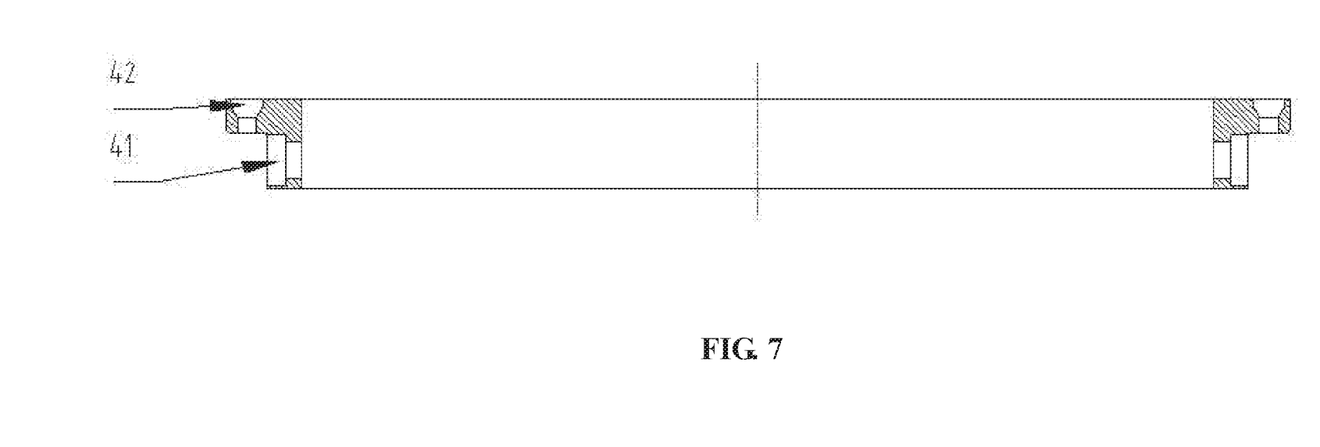
FIG. 7 is a structural schematic diagram of a connection ring of a light-weight compound wheel.
Figure 8:
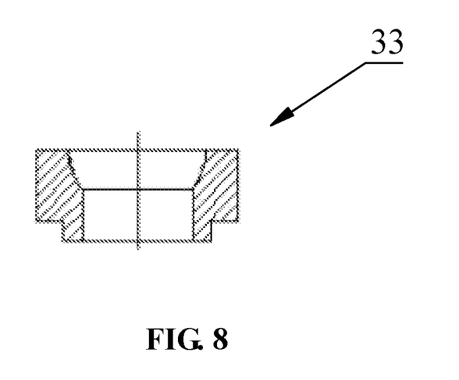
FIG. 8 is a structural schematic diagram of a steel sleeve of a light-weight compound wheel.
Figure 9:
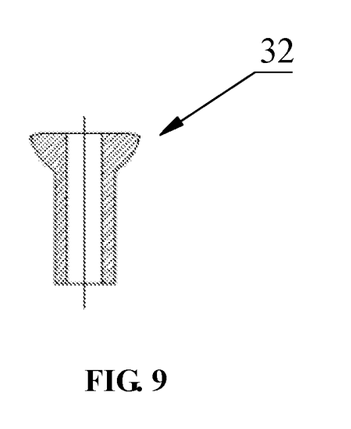
FIG. 9 is a structural schematic diagram of a locking sleeve of a light-weight compound wheel.

Details and working conditions of a specific apparatus provided by the present disclosure are described below in detail in conjunction with FIGS. 1 to 3.

A light-weight spoke compound wheel assembling apparatus includes a stand 1, a first servo motor 2, a power synchronizing belt wheel 3, a synchronizing belt 4, a driven synchronizing belt wheel 5, a base 6, a first connection shaft 7, a second servo motor 8, a first shaft sleeve 9, a lower end cover 10, a second connection shaft 11, a second shaft sleeve 12, an oil cylinder 13, first bearings 14, an end cover 15, a gland 16, second bearings 17, a base plate 18, a flange plate 19, pin shafts 20, springs 21, expanding petals 22, a third connection shaft 23, a protective part 24, an expanding core 25 and a locating ring 26.

The first servo motor 2 and the base 6 are fixed on the stand 1. The first shaft sleeve 9 is mounted on the base 6 through the first bearings 14 and the end cover 15. The power synchronizing belt wheel 3 and the driven synchronizing belt wheel 5 are respectively connected with the first connection shaft 7 and an output shaft of the first servo motor 2. The synchronizing belt 4 is connected with the power synchronizing belt wheel 3 and the driven synchronizing belt wheel 5. The lower end cover 10, the gland 16 and the base plate 18 are fixed on the first shaft sleeve 9. The second servo motor 8 is mounted on the lower end cover 19. The second shaft sleeve 12 is mounted on the first shaft sleeve 9 through the two columns of second bearings 17 and the gland 16. The oil cylinder 13 is fixed inside the second shaft sleeve 12. The output end of the oil cylinder 13 is connected with the third connection shaft 23. The second servo motor 8 is connected with the second shaft sleeve 12 through the second connection shaft 11, and the expanding core 25 is connected with the second shaft sleeve 12 through the third connection shaft 23. The expanding core 25, the third connection shaft 23 and the second shaft sleeve 12 are locked in a circumferential direction, with no relative rotation. The third connection shaft 23 and the second shaft sleeve 12 may move relatively along an axial direction. The flange plate 19 is fixed on the base plate 18. Eight uniformly distributed T-shaped sliding chutes are formed in inner cavities of the flange plate 19 and the base plate 18. The bottom surfaces of eight expanding petals 22 are of T-shaped structures respectively corresponding to the eight T-shaped sliding chutes one to one, and the expanding petals 22 may smoothly and accurately slide in the sliding chutes. The inner side walls of the expanding petals 22 are 15-degree slopes. Two ends of each of the eight springs 21 are respectively connected with the flange plate 19 and the corresponding one of the eight expanding petals 22. The side surface of the expanding core 25 includes two groups of first slopes 27 and second slopes 28 which are distributed in a uniform spacing manner and are inclined by 15 degrees. There are eight slopes in each group, and the slope in one group and the slope in the other group have a height difference. The upper end side walls of the two groups of slopes are intersected on a conical surface of a cone 29. Under the common action of a pulling force of the oil cylinder 13 and an elastic force of the springs 21, when the expanding core 25 is at the bottommost position, the side walls of the expanding petals 22 are in contact with the conical surface of the expanding core 25, and the second servo motor 8 drives the expanding core 25 through the second connection shaft 11, the second shaft sleeve 12 and the third connection shaft 23 to rotate 22.5 degree. The expanding petals 22 are switched between the first slopes 27 and the second slopes 28 of the expanding core 25 by cooperation with the slopes. The oil cylinder 13 drives the third connection shaft 23 and the expanding core 25 to move up and down. By the slope fit between the expanding petals 22 and the slopes of the expanding core 25, the eight expanding petals 22 do synchronous centripetal and centrifugal motions in the eight uniformly distributed T-shaped sliding chutes formed in the inner cavities of the flange plate 19 and the base plate 18, and the eight expanding petals 22 realize a high-precision synchronous expanding and retracting function. Due to the height difference between the two groups of uniformly spaced slopes on the side surface of the expanding core 25, when the second servo motor 8 drives the expanding core 25 to rotate 22.5 degree, the expanding petals 22 are switched between the first slopes 27 and the second slopes 28 of the expanding core 25 by cooperation with the slopes, so that an expanding and retracting diameter of the expanding petals 22 varies in two different ranges, and finally the expanding petals 22 achieve large-travel expansion and retraction. The locating ring 26 is mounted on the base plate 18. The coaxiality of the locating ring 26 and the expanding core 25 is very high, which is less than 0.05 mm. This positional tolerance is a key factor to guarantee the coaxiality accuracy of a hub 30 and the locating ring 26 after a wheel is assembled and also a key factor to ensure a qualified wheel hop.

A light-weight compound wheel, as shown in FIGS. 4 to 9, includes a hub 30, a plurality of titanium alloy spokes 31, locking sleeves 32, steel sleeves 33, connection rings 34, connection bolts 35 and a carbon fiber wheel rim 36. Each titanium alloy spoke 31 has a thread 37 on an end, and has an assembling hole 38 on another flat end. The hub 30 has upper and lower layers of ring slots on the side wall, and also has uniformly distributed threaded holes 40. The ends, provided with the assembling holes 38, of the titanium alloy spokes 31 are mounted on the ring slots 39 through the bolts fastened in the threaded holes 40 of the ring slots 39. The connection rings 34 have uniformly distributed first mounting holes 41 and second mounting holes 42 on both the side walls and the upper end faces. The steel sleeves 33 are pressed into the first mounting holes 41. The bolts that pass through the second mounting holes 42 fix the carbon fiber wheel rim 36 and the connection rings 34. Inner holes of the steel sleeves 33 are spherical surfaces. Upper side walls of the locking sleeves 32 are spherical surfaces, connected and matched with the spherical surfaces of the inner holes of the steel sleeves 33. Inner holes of the locking sleeves 32 are of threaded structures, and mesh with the threaded ends of the titanium alloy spokes 31. Lower side walls of the locking sleeves 32 are structural surfaces. A special tool can be matched with the structural surfaces of the locking sleeves 32 to rotate the locking sleeves 32, so as to adjust the tightness of the titanium alloy spokes 31. The connection bolts 35 cooperate with nuts to connect the connection rings 34 with the carbon fiber wheel rim 36 into a whole. By an assembling mode that the hub and the titanium alloy spokes 31 are connected through the ring slots 39, the titanium alloy spokes 31 have a degree of freedom of moving in the ring slots 39 along a circumferential direction, so that the assembling difficulty and the machining cost of the titanium alloy spokes 31 are effectively reduced. Through the cooperation of the spherical surfaces of the inner holes of the steel sleeves 33 and the spherical surfaces of the upper side walls of the locking sleeves 32, the locking sleeves 32 and the titanium alloy spokes 31 can rotate around the sphere centers of the steel sleeves 33 within a certain range. This structure can realize a spatial arrangement among the titanium alloy spokes 31, so as to meet requirements of a wheel for intensity, beauty and the like.

A process for assembling the light-weight compound wheel by using the above light-weight spoke compound wheel assembling apparatus is that: firstly, the hub 30 is placed on this apparatus; the expanding petals 22 and the expanding core 25 are put into the hub 30; an oil cylinder rod of the oil cylinder 13 is enabled to be in a retracted state; the slopes of the expanding petals 22 are in contact with the upper conical surface of the expanding core 25 under the action of the springs 21; the first servo motor 2 drives the expanding core 25 to rotate a specific angle according to the size of the diameter of the center hole of the hub 30 to allow the slopes of the expanding petals 22 to cooperate with the corresponding slopes of the expanding core 25; then, the oil cylinder 13 starts to work, and counteracts the elastic force of the springs 21 to drive the third connection shaft 23 and the expanding core 25 to move upwards; all the expanding petals 22 synchronously move to the outside along the eight uniformly distributed T-shaped sliding chutes formed in the inner cavities of the flange plate 19 and the base plate 18 through the slope cooperation of the expanding petals 22 and the expanding core 25; and finally, the expanding petals 22 are in contact with the center hole of the hub 30, and a locating and tensioning procedure for the hub 30 is completed.

Secondly, a series of titanium alloy spokes 31 are mounted on the ring slots 39 in the hub 30 through the bolts fastened in the threaded holes 40 in the ring slots 39 of the hub 30; then, the steel sleeves 33 are uniformly pressed into the first mounting holes 41 on the side walls of the connection rings 34; the connection rings 34 are placed on the locating ring 26; next, a series of locking sleeves 32 are capable of passing through the steel sleeves 33; the spherical surfaces of the inner holes of the steel sleeves 33 are matched with the spherical surfaces of the upper side walls of the locking sleeves 32; meanwhile, the threads of the inner holes of the locking sleeves 32 mesh with the ends, provided with the threads 37, of the titanium alloy spokes 31; the locking sleeves 32 are rotated by the special tool to adjust the tightness of the titanium alloy spokes 31, and the hub 30 is connected with the connection rings 34 into a whole through the titanium alloy spokes 31; and finally, the assembled connection rings 34 are mounted on the carbon fiber wheel rim 36 through the cooperation of the connection bolts 35 and the nuts. Since the locating ring 26 and the expanding core 25 are extremely high in coaxiality, which is less than 0.05 mm, a coaxiality requirement for the hub 30 and the locating ring 26 after wheel assembling is guaranteed, and then wheel hop is ensured to be qualified.

Thirdly, the oil cylinder 13 retracts, and the springs 21 drive the third connection shaft 23 and the expanding core 25 to move downwards by the elastic force; all the expanding petals 22 synchronously move to the inside along the eight uniformly distributed T-shaped sliding chutes formed in the inner cavities of the flange plate 19 and the base plate 18 through the slope cooperation of the expanding petals 22 and the expanding core 25, and finally they are separated from the center hole of the hub 30, so that the assembled wheel can be taken down. Therefore, the assembling work of the wheel is completed.

Second Embodiment

The Second Embodiment of the present disclosure is described in detail below in conjunction with FIGS. 1 to 3.

A compound wheel assembling apparatus includes a tensioning and fixing component, a locating ring 26 and a stand 1. The tensioning and fixing component can extend into a center hole of a hub to tension and fix the hub, and expanding petals 22 of the tensioning and fixing component have a plurality of different horizontal expanding and retracting moving distance ranges, so that cooperation of the expanding petals 22 and an expanding core 25 can be adjusted according to the size of the diameter of the center hole of the hub in a wheel to select an appropriate horizontal expanding and retracting moving distance range.

The tensioning and fixing component includes a base plate 18, a flange plate 19, springs 21, the expanding petals 22, the expanding core 25, an expanding petal rotating component, an expanding core rotating component and an expanding core lifting component. The flange plate 19 is used for placing the hub. The flange plate 19 is fixed on the base plate 18. Through holes are formed in the middles of the flange plate 19 and the base plate 18. A plurality of T-shaped sliding chutes uniformly distributed in a circumference are formed in inner cavities of the flange plate 19 and the base plate 18. The number of the expanding petals 22 is equal to the number of the T-shaped sliding chutes. The number in the present embodiment is equal to 8. The bottom surfaces of the expanding petals 22 are of T-shaped structures matched with the T-shaped sliding chutes. The expanding petals 22 can slide in the T-shaped sliding chutes. Side walls, facing the center axis of the hub, of the expanding petals 22 are slopes. The springs 21 are arranged between the expanding petals 22 and the flange plate. When the expanding petals 22 move along the T-shaped sliding chutes to the inner side wall of the center hole of the hub, they compress the springs 21. The expanding core 25 has slopes, which are consistent inclination angle and suitable for the expanding petals 22, on the side surfaces. The expanding core 25 can move up and down. The slopes of the expanding core 25 are matched with the side walls of the expanding petals 22. The movement of the expanding core 25 can push the expanding petals 22 to move toward the inner side wall of the center hole of the hub, and the expanding petals compress the springs 21 and press the inner side wall of the center hole of the hub to fix the position of the hub. The expanding petals 22 have two different horizontal expanding and retracting moving distance ranges. The expanding core 25 includes a middle cone 29, and first slopes 27 and second slopes 28 on the conical surface of the cone 29. The first slopes 27 and the second slopes 28 are consistent with the inclination angles of the expanding petals 22. The first slopes 27 and the second slopes 28 have a height difference. A plurality of first slopes 27 and a plurality of second slopes 28 are distributed around the circumference of the conical surface of the cone 29 in a uniform spacing manner. There are eight expanding petals 22, eight first slopes 27 and eight second slopes 28. A protective part is also arranged on the expanding core 25. The protective part, the expanding core 25 and the third connection shaft are fixed into a whole through the bolts.

The expanding petal rotating component can drive the base plate 18, the flange plate 19 and the expanding petals 22 to rotate horizontally to allow the side walls of the expanding petals 22 to be matched with the corresponding slopes of the expanding core 25. The expanding core rotating component can drive the expanding core 25 to rotate to allow the side walls of the expanding petals 22 to be matched with the corresponding slopes of the expanding core 25. The expanding core lifting component can drive the expanding core 25 to move up and down. The expanding core lifting component is arranged inside the expanding core rotating component. The expanding core rotating component is arranged inside the expanding petal rotating component.

The expanding petal rotating component includes a first servo motor 2, a power synchronizing belt wheel 3, a synchronizing belt 4, a driven synchronizing belt wheel 5, a first connection shaft 7, a first shaft sleeve 9, a base 6, first bearings 14 and an end cover 15. The first servo motor 2 is fixed in the stand. An output shaft of the servo motor 2 is fixedly connected with the power synchronizing belt wheel 3. The power synchronizing belt wheel 3 is connected with the driven synchronizing belt wheel 5 through the synchronizing belt 4. The driven synchronizing belt wheel 5 is connected to the first connection shaft 7. The first connection shaft 7 is fixed at an end of the first shaft sleeve 9. The base plate 18 is fixed at another end of the first shaft sleeve 9. The first servo motor 2 drives the power synchronizing belt wheel 3 to rotate. The power synchronizing belt wheel 3 drives the driven synchronizing belt wheel 5 to rotate through the synchronizing belt 4. The driven synchronizing belt wheel 5 drives the expanding petals 22 to rotate through the first connection shaft 7, the first shaft sleeve 9 and the base plate 18. As shown in FIG. 1, the base 6 is fixedly mounted inside the stand. The first shaft sleeve 9 is mounted on the base 6 through the first bearings 14 and the end cover 15.

The expanding core rotating component is arranged in the first shaft sleeve 9, and includes a second servo motor 8, a second connection shaft 11, a second shaft sleeve 12, a third connection shaft 23, second bearings 17 and a gland 16. An output shaft of the second servo motor 8 is fixedly connected with the second connection shaft 11. The second connection shaft 11 is fixed at an end of the second shaft sleeve 12. The third connection shaft 23 is arranged at another end of the second shaft sleeve 12. The expanding core 25 is connected with the second shaft sleeve 12 through the third connection shaft 23. The second shaft sleeve 12 is mounted on the first shaft sleeve 9 through two columns of second bearings 17 and the gland 16. The expanding core 25, the third connection shaft 23 and the second shaft sleeve 12 are locked in the circumferential direction, with no relative rotation. The third connection shaft 23 and the second shaft sleeve 12 may move up and down relatively along an axial direction. The second servo motor 8 drives the expanding core 25 to rotate through the second connection shaft 11, the second shaft sleeve 12 and the third connection shaft 23. The expanding core lifting component is arranged in the second shaft sleeve 12, and includes an oil cylinder 13; a piston rod of the oil cylinder 13 is connected with an end of the third connection shaft 23, and another end of the third connection shaft 23 is fixedly connected with the expanding core 25. The oil cylinder drives the expanding core 25 to move up and down through the third connection shaft 23.

The locating ring 26 is arranged around the base plate 18 on the stand, and has a center axis overlapping the center axis of the base plate 18. The locating ring has a circle of circular-ring-shaped protrusion on the outer side. The circular-ring-shaped protrusion is used for mounting a wheel rim of a wheel or a connection piece of the wheel rim of the wheel.

An assembling method of a compound wheel assembling apparatus in the Second Embodiment refers to the assembling method of the light-weight compound wheel in the First Embodiment.

Figure 10:
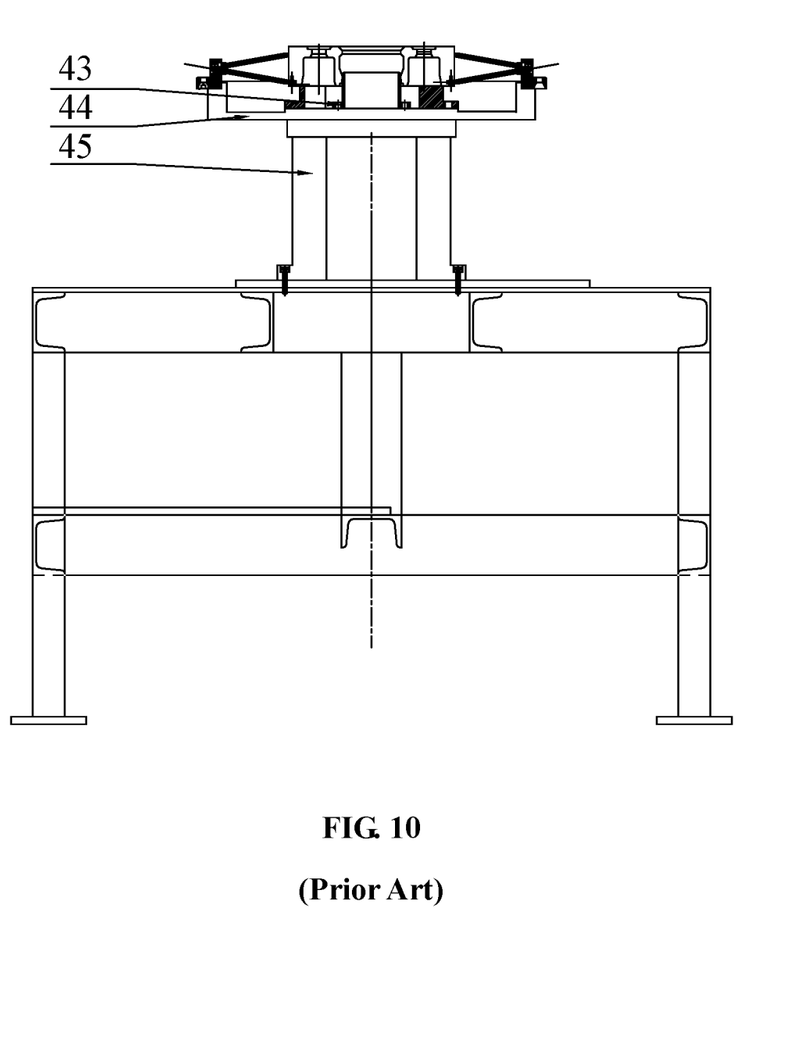
FIG. 10 is a structural schematic diagram of a compound wheel assembling apparatus in the related art, including a mandrel, a snap ring and a second base.

FIG. 10 illustrates a compound wheel assembling apparatus in the related art, which includes a mandrel 43, a snap ring 44 and a second base 45. Compared with the compound wheel assembling apparatus according to the present disclosure including the tensioning and fixing component structure and the locating ring, the compound wheel assembling apparatus in FIG. 10 does not meet the requirements of automatic wheel assembly and therefore results in low productivity.

According to the compound wheel assembling apparatus provided in the present disclosure, on one aspect, the tensioning and fixing component structure is designed. The movement of the expanding core cooperates with the expanding petals so as to fix the flange plate tightly to meet automatic assembling requirements of a wheel, which reduces the labor intensity of workers, saves the labor cost, improves the production efficiency, and guarantees the reliability of assembling and the product quality. On the other aspect, the locating ring is provided. Since the locating ring and the expanding core are extremely high in coaxiality, a coaxiality requirement for the hub and the wheel rim after wheel assembling is guaranteed, and then wheel hop is ensured to be qualified.

The embodiments of the present disclosure are described in detail above, particular examples are used herein to explain the principle and embodiments of the present disclosure, and the above description of the embodiments is only used for helping understanding the methods and core concept of the present disclosure; and meanwhile, for those having ordinary skill in the art, according to the idea of the present disclosure, there will be changes in the specific implementation mode and scope of the present disclosure, in conclusion, the contents of the specification shall not be construed as a limitation of the present disclosure.

The invention claimed is:

1. A compound wheel assembling apparatus, comprising a tensioning and fixing component and a locating ring, wherein
the tensioning and fixing component is arranged to extend into a center hole of a hub to tension and fix the hub; the tensioning and fixing component comprises a base plate, a flange plate, springs, expanding petals and an expanding core; the flange plate is used for placing the hub and is fixed on the base plate; through holes are formed in a middle of the flange plate and in a middle of the base plate; side walls, facing a center axis of the hub, of the expanding petals are sloped; the springs are arranged between the expanding petals and the flange plate; when the expanding petals move to an inner side wall of the center hole of the hub, the springs are compressed by the expanding petals; the expanding core has slopes on side surfaces of the expanding core, and the slopes of the expanding core are matched with the side walls of the expanding petals; the expanding core is configured to move up and down; the movement of the expanding core pushes the expanding petals to move toward the inner side wall of the center hole of the hub, and the expanding petals compress the springs and press the inner side wall of the center hole of the hub to fix a position of the hub; and
the locating ring is arranged around the base plate, and has a center axis overlapping a center axis of the base plate; the locating ring has a circle of circular-ring-shaped protrusions on an outer side of the locating ring; and the circular-ring-shaped protrusions are used for mounting a wheel rim of a wheel or a connection piece of the wheel rim of the wheel.

2. The compound wheel assembling apparatus according to claim 1, wherein the expanding petals of the tensioning and fixing component have a plurality of different horizontal expanding and retracting moving distance ranges, so that cooperation of the expanding petals and the expanding core can be adjusted according to a size of a diameter of the center hole of the hub in the wheel to select an appropriate horizontal expanding and retracting moving distance range.

3. The compound wheel assembling apparatus according to claim 2, wherein the expanding core comprises a middle cone, a plurality of first slopes and a plurality of second slopes on a conical surface of the middle cone; the plurality of first slopes and the plurality of second slopes are consistent with inclination angles of the expanding petals; the plurality of first slopes have different height from the plurality of second slopes; and the plurality of first slopes and the plurality of second slopes are distributed around a circumference of the conical surface of the middle cone in a uniform spacing manner.

4. The compound wheel assembling apparatus according to claim 3, wherein eight expanding petals, eight first slopes and eight second slopes are provided.

5. The compound wheel assembling apparatus according to claim 1, wherein the tensioning and fixing component further comprises an expanding petal rotating component, an expanding core rotating component and an expanding core lifting component; the expanding petal rotating component is configured to drive the base plate, the flange plate and the expanding petals to rotate horizontally to allow the side walls of the expanding petals to be matched with the corresponding slopes of the expanding core; the expanding core rotating component drives the expanding core to rotate to allow the side walls of the expanding petals to be matched with the corresponding slopes of the expanding core; the expanding core lifting component is configured to drive the expanding core to move up and down; the expanding core lifting component is arranged inside the expanding core rotating component; and the expanding core rotating component is arranged inside the expanding petal rotating component.

6. The compound wheel assembling apparatus according to claim 5, wherein the expanding petal rotating component comprises a first servo motor, a power synchronizing belt wheel, a synchronizing belt, a driven synchronizing belt wheel, a first connection shaft, and a first shaft sleeve; an output shaft of the first servo motor is fixedly connected with the power synchronizing belt wheel; the power synchronizing belt wheel is connected with the driven synchronizing belt wheel through the synchronizing belt; the driven synchronizing belt wheel is connected to the first connection shaft; the first connection shaft is fixed at an end of the first shaft sleeve; the base plate is fixed at another end of the first shaft sleeve; the first servo motor drives the power synchronizing belt wheel to rotate; the power synchronizing belt wheel is configured to drive the driven synchronizing belt wheel to rotate through the synchronizing belt; and the driven synchronizing belt wheel is configured to drive the expanding petals to rotate through the first connection shaft, the first shaft sleeve and the base plate.

7. The compound wheel assembling apparatus according to claim 6, wherein a base is fixedly mounted inside a stand; and the first shaft sleeve is mounted on the base through first bearings and an end cover.

8. The compound wheel assembling apparatus according to claim 6, wherein the expanding core rotating component is arranged in the first shaft sleeve, and comprises a second servo motor, a second connection shaft, a second shaft sleeve and a third connection shaft; an output shaft of the second servo motor is fixedly connected with the second connection shaft; the second connection shaft is fixed at an end of the second shaft sleeve; the third connection shaft is arranged at another end of the second shaft sleeve; the expanding core is connected with the second shaft sleeve through the third connection shaft; the second shaft sleeve is mounted on the first shaft sleeve through two columns of second bearings and a gland; the expanding core, the third connection shaft and the second shaft sleeve are locked in a circumferential direction, with no relative rotation; the third connection shaft and the second shaft sleeve are configured to move up and down relatively along an axial direction; and the second servo motor is configured to drive the expanding core to rotate through the second connection shaft, the second shaft sleeve and the third connection shaft.

9. The compound wheel assembling apparatus according to claim 8, wherein the expanding core lifting component is arranged in the second shaft sleeve, and comprises an oil cylinder; a piston rod of the oil cylinder is connected with an end of the third connection shaft, and another end of the third connection shaft is fixedly connected with the expanding core; and the oil cylinder is configured to drive the expanding core to move up and down through the third connection shaft.

10. The compound wheel assembling apparatus according to claim 8, wherein a protective part is further arranged on the expanding core; and the protective part, the expanding core and the third connection shaft are fixed to define an integral part through bolts.

* * * * *